Dec. 19, 1961            G. A. THOMAS            3,014,121

WELDING GROUND MACHINE

Filed Oct. 13, 1958                                    2 Sheets-Sheet 1

INVENTOR
GLYN A. THOMAS

BY    *Klim and Padlon*

ATTORNEYS

Dec. 19, 1961  G. A. THOMAS  3,014,121
WELDING GROUND MACHINE
Filed Oct. 13, 1958  2 Sheets-Sheet 2

INVENTOR
GLYN A. THOMAS

BY Klein and Paulson
ATTORNEYS

United States Patent Office 3,014,121
Patented Dec. 19, 1961

3,014,121
WELDING GROUND MACHINE
Glyn A. Thomas, Charlotte, N.C., assignor to Charlotte Tank Corporation, Charlotte, N.C., a corporation of North Carolina
Filed Oct. 13, 1958, Ser. No. 766,814
10 Claims. (Cl. 219—159)

This invention relates to a welding ground machine for rotating workpieces, and more particularly to a machine for grounding and at the same time welding cylindrical pieces while being rotated.

In the construction of pressure vessels and tanks of steel, it is customary to assemble them by means of circumferential welds which require the rotation of the vessel during assembly and welding in order to present the juxtaposed parts in a convenient aspect for welding. Electric arc welding, employing currents of as much as a thousand amperes, is commonly used for the purpose, and is accomplished by means of a welding machine carrying the welding electrode and energized by a welding current source over a flexible single conductor cable. Ground return for the welding current is provided by means of a ground wire running to the source and connected to the workpiece being welded. It is with means for so connecting the grounding cable to the workpiece, and more particularly with novel and improved means for advantageously making such connection to a rotating tank, that this invention is concerned.

Various arrangements of the prior art are known, in which a rotatable connector must be bolted to the workpiece or retained in sleeve bearings while sliding electrical contact is made thereto, either through such bearings, or through separate ring members attached to the connectors. The bolting of a conductor however, onto each workpiece is time consuming, and is not possible in the case of tanks having no flanges, or tanks not provided with convenient bolt holes for other reasons. It is found further, that the quality of contact made with rotating connectors having sleeve bearings is not uniformly dependable, since wear in the bearing inevitably increases the bearing clearance and causes erratic changes in contact area and hence in electrical resistance. The use of separate slip rings on a rotating connector necessitates an unduly large size of the connector, in view of the heavy current requirements, as well as providing no quick means for attachment to the workpiece.

It is therefore an object of this invention to provide a rotary grounding means for high current welding of tanks which can be connected to the tank with extreme rapidity.

It is another object of the present invention to provide such a grounding means in which the rotating connector is relatively small in size and light in weight.

A further object of the invention is to provide such grounding means which is unaffected in its efficiency because of wear.

Still another object of the invention is to provide such grounding means capable of being attached or disconnected from a remote location.

A further object of the invention is to provide a simplified rotary connector having improved performance and capable of being produced at reduced cost.

To attain these and other objects of my invention as will become apparent, I have found that it is possible to provide grounding means connectable to the workpiece by strong pneumatic pressure at or reasonably near the center of rotation thereof. The contact pressure thus can be made sufficient to provide reliable contact with the workpiece. Also, I employ a pressure reducing valve adjusted to reduce the air pressure in the customary air mains of a factory to the appropriate value necessary to effect this purpose when applied to a pneumatic cylinder for pressing the grounding means strongly against the workpiece.

In order to do this it is necessary to provide a thrust bearing between the rotating workpiece and the stationary pneumatic cylinder, and in order that a grounding cable may be connected to the stationary portion, it is essential that such a bearing constitute an excellent conductor of electricity. This I accomplish by the use of a ball and socket bearing. Ordinarily, such a bearing requires the use of a fluid lubricant which is non-conducting, if friction of the joint is to be maintained at a tolerable value, under this condition of heavy load. Since high conduction is essential, a conducting lubricant, such as powdered flake graphite, is employed. The introduction of particles of carbon or of graphite, which is an allotropic form of carbon, between these fitted metal surfaces could normally be expected to result in the production of innumerable minute arcs and sparks destructive of the bearing surfaces when a heavy current is passed through them. Under the high bearing pressure imposed by the air cylinder however, I find that such arcing does not occur if the graphite is finely divided and an excess of lubricant is avoided. Under such pressure however, even though adequately lubricated to reduce friction, the bearing is subject to galling. The common expedient of making one surface of iron and the other of brass cannot be used to avoid this, because of unduly low conductivity of the iron. By making one member of brass having a composition producing a hard surface, and making the other or mating member of common soft brass, however, this difficulty can be overcome to an adequate degree. The harder brass may be produced by the use of any common additive used for this purpose, such, for example as manganese, silicon, or phosphorus.

Because of the employment of principles above described, I find it advantageous to provide pneumatic control features later to be described for operation of the air cylinder at different pressures on the forward and return strokes, and to provide a rugged and pre-aligned unitary structure, comprising one cylinder actuated bearing and one passive bearing, by which means the operation is made simple and semi-automatic, and very rapid for production purposes. I also find that an overhead rail of adjustable height can then be used to support automatic welding machines positioned so that semi-automatic operation is further facilitated.

The features and other objects of my invention will become apparent from the following detailed description, wherein.

Figure 1:
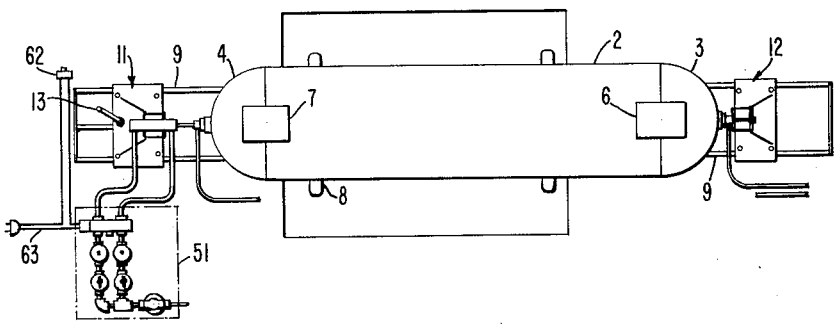
FIG. 1 is a top view of a preferred embodiment of the invention as used.

Referring now to the drawings wherein like numerals refer to like parts throughout, there is seen in FIG. 1 a top view of a tank or pressure vessel 2 having domed end pieces 3 and 4 which are affixed thereto by tack welding preparatory to being seam welded by the welding heads 6 and 7. Trunnions, such as 8, support the tank for rotation about its axis as welding progresses. Bed rails such as 9, lying in a horizontal plane, have carriages 11 and 12 movable laterally over them, the carriage 11 being propelled by means of a crank handle 13 which is seen more clearly in FIG. 5 to be mounted on pinion shaft 14 and located for engagement of a terminal pinion gear with the rack 16 shown in detail at 17 to reveal its construction.

Rack 16 is fastened to and supported by cross members 18 and 21 respectively and by the end member 19, all secured to the rails 9. Gibs 22 and 23 provide an upper surface for supporting carriage rollers, such as 24, bolted to the brackets 26 and also engage with their lower surfaces the clamps 27 to provide stability and smooth operation to the carriage 11. Bed plate 28 of carriage 11 has also rollers such as 29 engaging the rails 9 bolted to it for lateral stabilization, and vertical members 31 and 32 securely affixed thereto and containing a series of equally spaced openings or holes such as 33. A bolt 34 is passed through corresponding holes 33 to secure the contact mechanism 36 at the desired height to accommodate the cylindrical workpieces of various diameters as circumstances may require. The contact mechanism 36 consists of a double acting pneumatic actuator 37 as shown in greater detail in FIG. 3, comprising a cylinder and contained piston, reversibly operable by air pressure supplied through hose connectors 38 or 39 alternatively to extend or retract piston rod 41, seen also in FIG. 4.

A socket member 42 is screwed onto the end of piston rod 41 and has a bearing surface 43 in the form of a substantially spherical concavity. A through hole 44 in the rod end provides for the attachment of a grounding cable, and a hole 45, threaded for a closure, provides for the admission of lubricant to the interface 43 which comprises a film of finely divided and attenuated graphite of microscopic thickness or other suitable lubricant which acts as if embedded in the surfaces of socket 42 and ball member 46. Ball member 46 is made of soft brass, in distinction to socket member 42 which is made of hard brass, for reasons disclosed herein and in order that the female member may be constructed of the more resistant material in order to avoid distortion due to the large forces transmitted through the structure. Ball member 46 has a concave extremity 47 for engagement of the customary weldment, and has a counterbored hole 48, larger than the screw 49 which loosely retains it in socket member 42, for convenience in changing workpieces, and to prevent loss or damage of the lubricant film. Through holes 49 are provided in screw 49 and piston rod 41 for insertion of pins to prevent the joints from working loose. The concavity 47 of member 46 can only approximate the shape of the workpiece, because the tank is usually rough on the exterior, and not perfectly formed. Because of the fact that a ball and socket bearing is used, however, this unevenness makes no difference, and is perfectly accommodated by the bearing without any side stresses being developed as happens with other types of bearing.

Figure 3:
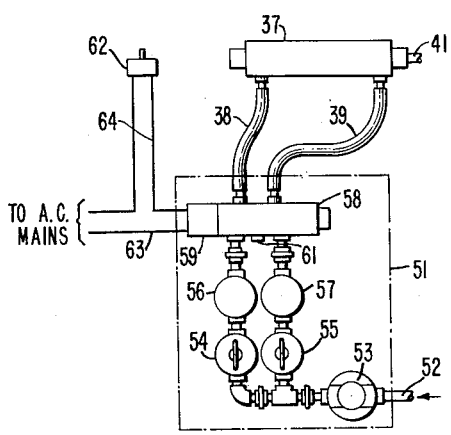
FIG. 3 is a diagrammatic view of an assembly of a portion of FIG. 1.
Figure 4:
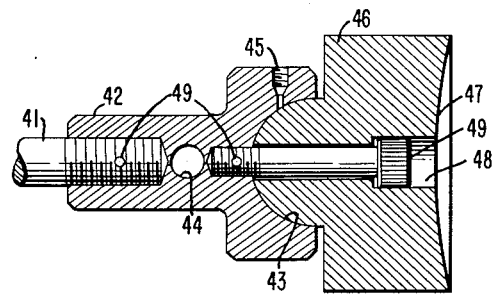
FIG. 4 is a detail view of a portion of the embodiment shown in FIG. 1.
Figure 5:
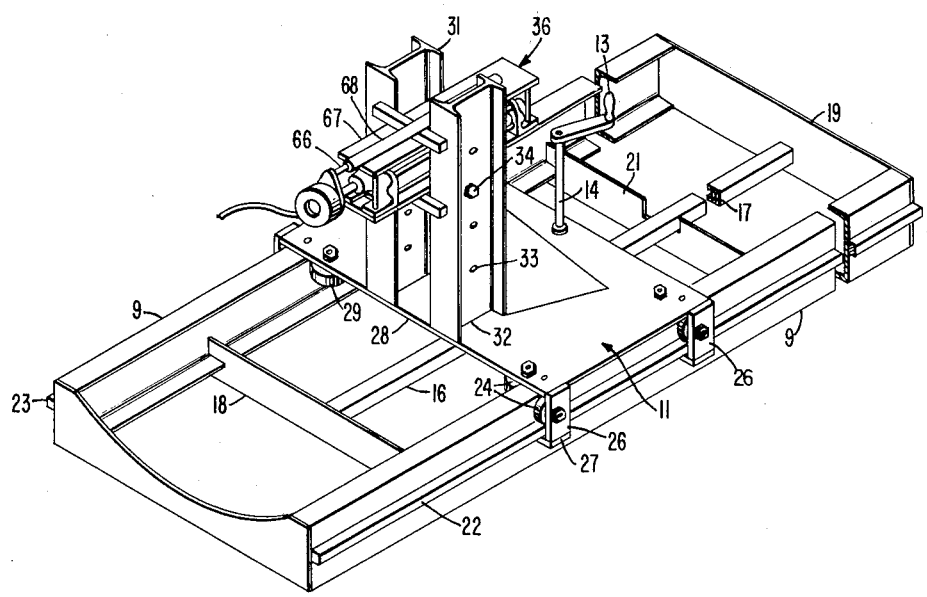
FIG. 5 is a perspective view of another portion of the embodiment shown in FIG. 1.

In the diagram of FIG. 3 there is shown an assembly 51 comprising an entering compressed air line 52, air line filter 53, pressure reducing valves 54 and 55, lubricators 56 and 57 and the so called "four way valve" 58 operated by its contained solenoid 59. Air at one pressure is thus normally supplied to cylinder 37 through line 39 to retract it, but can be exhausted therefrom at opening 61, and air at a higher pressure as set by reducing valve 54 supplied through line 38. This is done by manually operating remote toggle switch 62 to the closed position to energize solenoid 59 over wires 63 and 64 with current from the mains. Solenoid 59 then moves the bobbin of valve 58 to effect the indicated operations in the usual manner. In practice, it is desirable to have a bar 66 as shown in FIG. 5, fastened to the extremity of piston rod 41, and slidable in a tube 68 secured to cylinder upper mounting plate 67. This prevents rotation of the piston while in use.

Figure 2:
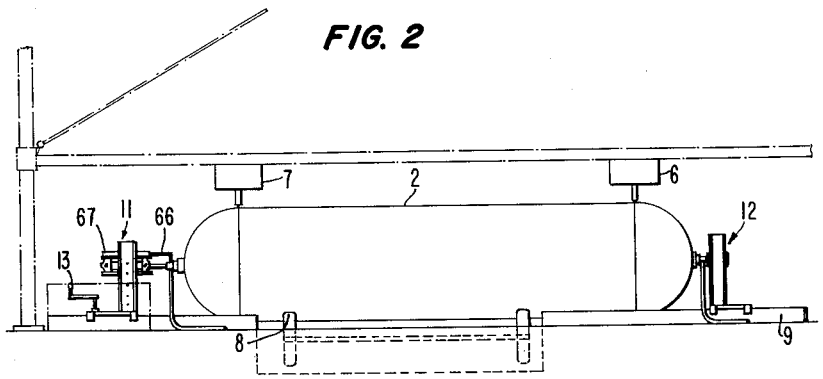
FIG. 2 is a side view of FIG. 1.

An assembly such as shown in FIG. 5 is required at one end of the machine, as shown in FIG. 2, but at the opposite end, only a tailstock and a similar bearing are used. The tailstock need not be provided with an adjusting handle such as 13, so that it and its associated mechanism may be deleted from the tailstock assembly.

As shown in FIG. 2 it will be noted that welding heads 6 and 7 may be supported by an overhead beam of adjustable height for the accommodation of workpieces of various heights and for the location of seams at different distances along the tank. It is also to be noted that because of the high current capacity of my improved grounding connector, it is feasible to operate a plurality of welding heads simultaneously on the same workpiece.

It will be seen from the foregoing description and accompanying drawings that by my invention, the cost of antifriction bearings is eliminated, without loss of their relevant advantages, that wear and deterioration inherent in sleeve bearings under load is eliminated, and that their great disadvantages for this use avoided. Also, the sound welds free from weak spots due to modulation of the arc by variable ground resistance, are assured.

Although, this invention has been described in terms of a specific illustrative example thereof, it is clear that various modifications thereof will occur to those skilled in the art which, however, do not depart from the spirit and scope of the invention disclosed, and it is therefore intended that the invention shall be limited only by the scope of the appended claims.

I claim:
1. In a seam welding machine for fluid storage tanks and the like a rigid bed comprising tank supporting trunnions and parallel bed rail means, extending beyond the tank in each direction, a pair of carriage means mounted on said rails for longitudinal motion thereon and rollers pivoted on said carriage, means comprising the mounting of said carriage means on said rails, rotating grounding means on one of the said carriage means, vertically adjustable thereon and comprising a double acting cylinder and a piston therein for actuation by fluid pressure, a socket member on said piston having a transverse bolt hole for ground wire attachment and having a feed hole communicating with the socket for lubricant supply, said socket member being made of a hard brass alloy, a ball member of soft brass closely engaging said socket member, having a counterbored axial clearance hole for loosely bolting to said socket member, and having a concave, tank engaging end, rotating grounding means on the other said carriage means, vertically adjustable thereon and comprising a said ball member and a said socket member; and a lubricant between said ball and socket members.

2. A grounding machine for welding tank seams comprising parallel bed rails, trunnions located on lines parallel thereto and oriented parallel thereto, headstock and tailstock means movable on said bed rails and adjustable in height, and grounding connector means adjustably mounted on said headstock and tailstock, said connector means each comprising a headstock, a socket secured to one of said headstocks and arranged for attachment of a ground wire thereto, a ball for engagement of said socket, and having a tank engaging end for electrically contacting said tank on centers and a conductor film between said ball and said socket.

3. A rotary tank grounding connector according to claim 10 wherein the stationary socket member consists of brass containing a substantial portion of alloying metal selected from the group consisting of silicon, manganese, and phosphorus, and the ball member consists of brass.

4. The machine of claim 1 wherein said double acting cylinder is attached to a control mechanism comprising an air filter, a pair of pressure reducing valves, a pair of lubricant injectors, a multiple ported control valve, said valve having inlets connected to said pressure reducing valves through said lubricant injectors, and having outlets connected to front and rear chambers of said cylinder, and having an exhaust outlet, an electric solenoid connected to operate said control valves and a remotely located electric switch connected to energize said solenoid to move said valve to a position for piston rod extending tank engagement.

5. A tank welding machine comprising transverse bed means, roller trunnion means aligned with said bed means for rotatable tank support, an upright bracket movable along said bed means and having a plurality of mounting holes vertically aligned for height adjustment, linear actuator means retained on said bracket at a height adjustable by said mounting holes to the center of a tank on said bed means, and having a thrust rod aligned with said bed means, a socket ended bearing member of a high conductivity metal, said member having means for welding cable connection, a film of graphite in the socket of said member, a ball ended bearing member of high conductivity metal in said socket member for actuator-forced contact with one end of a tank, and a second bracket on said bed means to engage the other end of such tank.

6. The machine according to claim 5 wherein said second bracket has mounted thereon a thrust bearing comprising a hard socket member, a softer ball member, and a dry lubricant film therebetween, said ball, socket, and film being of high conductivity material.

7. The article of claim 5 wherein there is a headed fastening member disposed axially in said socket ended bearing member, and in an axial clearance hole in said ball ended bearing member, and said bearing members thereby are retained loosely engaged when at rest.

8. The article of claim 6 wherein there is an overhead rail running parallel to said bed rails and between them, supporting means for said overhead rail, means to adjust the height of said overhead rail, and at least one welding machine dependent therefrom and movable therealong.

9. A seam welding machine constructed in accordance with claim 1, wherein the said lubricant between said ball and socket members comprises particles of an electrically conductive lubricant maintained in an elastically deformed condition during the welding period by piston pressure produced by said actuating fluid, whereby low and uniform contact resistance between the rotating ball member and the stationary socket assembly is preserved.

10. A machine according to claim 2 wherein such tank grounding connector for welding is rotary and comprises a stationary socket member, a ball member having a counterbored axial clearance hole therein, axial bolt means engaging said socket member, positioned within said axial hole, and loosely engaging said ball member, a film of flake graphite between said ball member and said socket member, and reciprocable fluid actuator means to apply pressure contact making force to said film.

References Cited in the file of this patent

UNITED STATES PATENTS

| | | |
|---|---|---|
| 935,346 | Winfield | Sept. 28, 1909 |
| 2,296,286 | Leathers | Sept. 22, 1942 |
| 2,424,892 | Malke | July 29, 1947 |
| 2,439,371 | Sandberg | Apr. 6, 1948 |
| 2,475,051 | Raymond | July 5, 1949 |
| 2,479,197 | Anderson | Aug. 16, 1949 |
| 2,540,180 | Wirt | Feb. 6, 1951 |
| 2,753,826 | Dougherty | July 10, 1956 |